Mar. 20, 1923.
J. W. ZEHRINGER
1,448,898
COMBINED BACKWATER VALVE AND FLUSHING SYSTEM
Filed Aug. 23, 1922
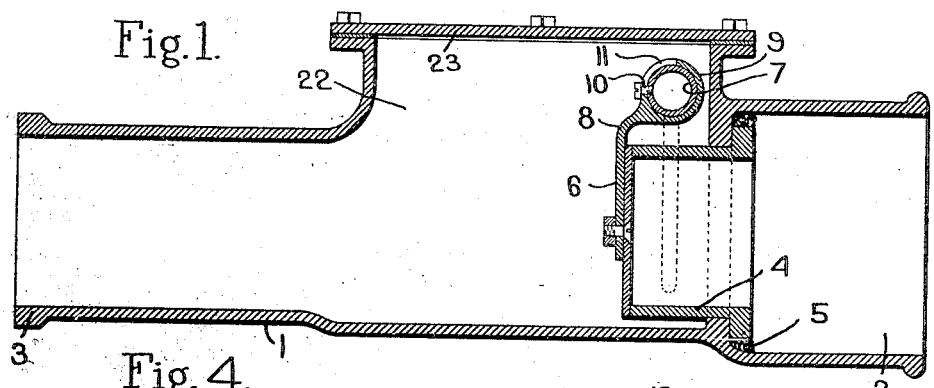
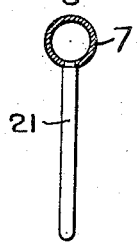
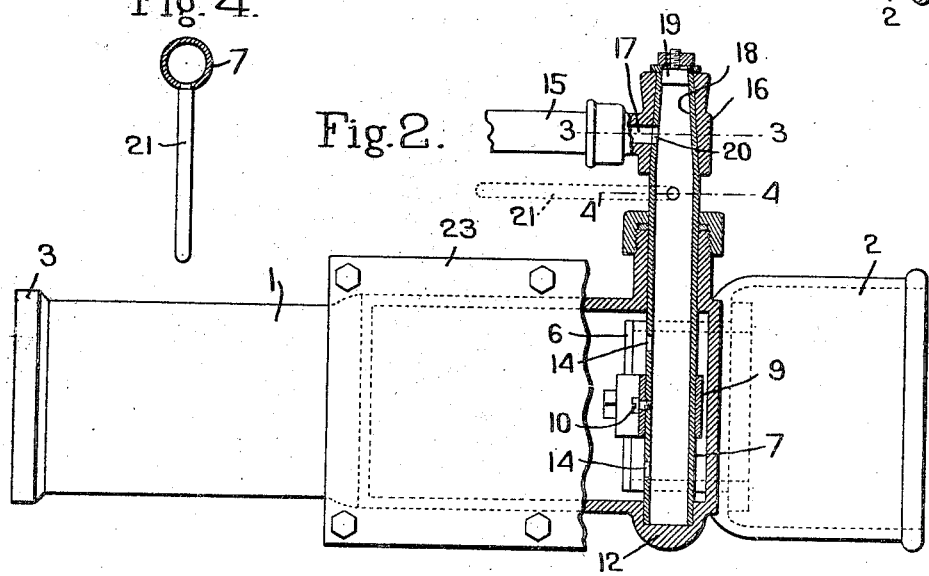
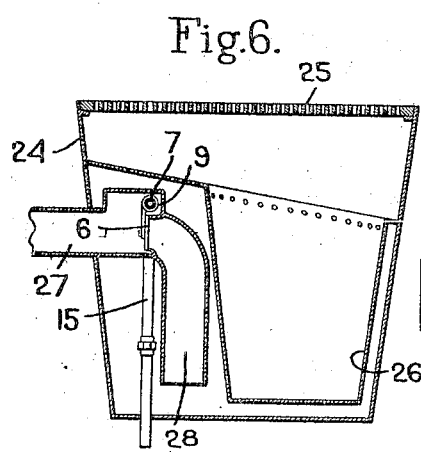
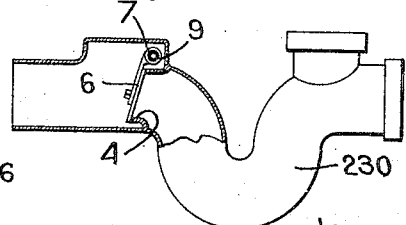
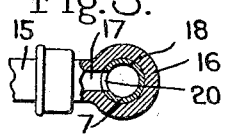
Inventor.
John W. Zehringer
by Heard Smith & Tennant.
Attys.

Patented Mar. 20, 1923.

1,448,898

UNITED STATES PATENT OFFICE.

JOHN W. ZEHRINGER, OF WINTHROP, MASSACHUSETTS.

COMBINED BACKWATER VALVE AND FLUSHING SYSTEM.

Application filed August 23, 1922. Serial No. 583,769.

*To all whom it may concern:*

Be it known that I, JOHN W. ZEHRINGER, a citizen of the United States, and resident of Winthrop, county of Suffolk, State of Massachusetts, have invented an Improvement in Combined Backwater Valves and Flushing Systems, of which the following description, in connection with the accompanying drawing, is a specification, like characters on the drawing representing like parts.

In many conduits, such for instance as drains and the like, it is more or less common to introduce what is termed a back water valve, this being a check valve which will permit the water to flow through the conduit in one direction but will close to prevent water from flowing in the other direction of the conduit and backing up therein.

My invention relates to a device of this sort and has for its object to provide a novel construction by which the check valve can be positively closed and at the same time water introduced on the delivery side thereof for flushing the drain and system.

Another object of the invention is to provide a novel construction in which the operation of turning on the water for flushing the system will automatically close the check valve so as to prevent the water used for flushing from backing up in the conduit.

Other objects of the invention are to improve generally devices of this nature all as will be more fully hereinafter set forth.

In order to give an understanding of the invention I have illustrated in the drawings a selected embodiment thereof which will now be described after which the novel features will be pointed out in the appended claims.

Figure 1 is a vertical sectional view of a conduit section having my improvements applied thereto.

Fig. 2 is a top plan view thereof with a part broken out.

Fig. 3 is a section on the line 3—3, Fig. 2.

Fig. 4 is a section on the line 4—4, Fig. 2.

Fig. 5 is a view of a conduit in the form of a trap having my improvements applied thereto.

Fig. 6 shows one way of applying my improvements to a floor drain.

My invention may be applied to conduits of various forms and in Figs. 1 and 2 I have shown it as it might be installed in an ordinary drain pipe. In these figures 1 indicates a drain pipe section having a hub 2 at one end to receive the spigot of another drain pipe section and having a spigot 3 at the other end to enter the hub of the adjacent section. Situated in this drain pipe section is a sleeve 4 which is calked therein as shown at 5 and the end of which forms a valve seat for a back water or check valve 6.

In the present embodiment of my invention this check valve is pivotally mounted on a tubular member or pipe section 7 which extends transversely across the conduit section 1. The check valve 6 is provided with an arm 8 having a hub 9 which encircles the pipe 7 and can turn thereon to allow the valve to open and close. The pipe 7 is shown as having a stop screw 10 which operates in a slot 11 formed in the hub 9. This pipe 7 is journalled at one end in a bearing 12 formed on the conduit section 1, said bearing operating to close said end of the pipe and said pipe extends through a stuffing box formed in the opposite wall of the conduit section. This pipe 7 is formed with discharge ports 14 and it is connected with a supply pipe 15 through a suitable valve, said supply pipe connecting with any suitable source of water supply. When the valve is open then water can flow through the pipe section 7 and discharge ports 14 into the conduit section 1 on the discharge side of the valve 6 thereby furnishing water for flushing the drain beyond the valve.

The construction is such that when the valve is opened to permit a free flow of the water through the pipe 7 to flush the system, the check valve 6 will be positively closed so as to prevent the water from backing up in the conduit.

The valve I have herein shown for this purpose consists of a valve casing 16 having a port 17 with which the pipe 15 communicates and a valve member 18 formed on the end of the pipe section 7, said valve member being in the form of a plug valve.

The valve portion 18 of the pipe 7 is shown as tapered slightly to fit the valve casing 16 and the end of the pipe is closed by the plug 19. This valve portion 18 is formed with a port 20 which can be brought into and out of register with the port 17 by turning the pipe 7. This pipe is provided with a handle 21 by which it may be turned.

The pipe 17 is shown in Figs. 1 and 2 in position in which the port 20 is in register with the port 17 so that water can flow through the pipe 7 for flushing purposes. When in this position the stop screw 10 is at the lower end of the slot 11 and the valve 6 is thus locked in this closed position. This is the position of the parts during the flushing operation. When the pipe 7 is turned through 90° to bring the stop screw 10 into the dotted line position Fig. 1 the port 20 will be carried out of alignment with the port 17 thus shutting off the water from the pipe 7 and when the parts are in this position the check valve 3 is free to open and close as an ordinary back water valve. This is the normal position of the parts and when the parts are thus positioned the device will operate as an ordinary back water valve.

When it is desired to flush the system then the parts are turned into the position shown in Figs. 1 and 2 thereby positively closing the check valve and opening the valve leading to the pipe 7 so that water can flow therethrough.

The conduit section 1 is shown as being enlarged somewhat as shown at 22 to accommodate the mechanism above described and it is also provided with the opening which is closed by the removable cover 23. The removal of the cover 23 permits access to the valve 6.

In Fig. 5 I have shown a construction wherein my improved checkvalve is associated with a pipe fitting in the form of a trap 23. In this case the outlet end of the trap is formed with a valve seat 4 on which the back water valve 6 rests and the latter is provided with the flushing device all as above described.

In Fig. 6 I have shown my invention as it might be applied to a floor drain trap such as is used in garage floors or any other places where surface water is to be drained. In this construction 24 indicates the body of the trap having the grating 25 at its top and 26 indicates the sediment chamber. The outlet pipe is shown at 27 and it is provided with the downturned end 28 leading nearly to the bottom of the casing 24.

My combined back water and flushing valve 6 is located in the discharge pipe 27 and operates as above described.

The drawings show only a view of many different installations which may be made with my improved back water flushing valve and I wish it understood that the invention can be installed in a great variety of other drainage systems or drain fittings than is herein illustrated.

Under some circumstances it may be desirable to introduce steam or steam and water into the system for flushing purposes and, of course, this may be done by simply connecting the pipe 7 to a suitable source of steam supply or steam and water supply as the case may be.

Among the drain fittings to which the invention may be applied may be mentioned the ordinary sink waste pipe and other plumber's fixtures such as lavatories, urinals, etc.

I claim.

1. The combination with a conduit section, of a back water check valve therein, of means for admitting flushing water to the conduit on the discharge side of the check valve, said means having provision for mechanically closing the check valve positively.

2. In a device of the class described, the combination with a conduit section, of a back water check valve therein, a valve device for admitting flushing water to the conduit on the discharge side of said check valve, and mechanical means associated with the valve device to positively close the check valve when said valve device is open.

3. In a device of the class described, the combination with a conduit section having valve seat therein, a pipe section located in the conduit and extending through one wall thereof, a back water valve pivotally mounted on the pipe section and adapted to close against said valve seat, said pipe section having discharge ports for flushing water on the discharge side of the check valve, a valve device for admitting water to said pipe section, and means to close positively the back water valve when said valve device is open.

4. In a device of the class described, the combination with a conduit section having a valve seat therein, of a pipe section rotatably mounted in the conduit section, a back water valve pivotally mounted in the pipe section and adapted to close against said valve seat, said pipe section having discharge ports to deliver water on the discharge side of the check valve and also having a valve portion extending beyond the conduit section and provided with a port, a valve casing in which said valve portion is rotatably mounted and also provided with a port, said valve casing communicating with a supply pipe, a turning movement of the pipe section bringing said ports into and out of register, and means for holding the check valve to its seat when said ports are in register.

In testimony whereof, I have signed my name to this specification.

JOHN W. ZEHRINGER.